(12) United States Patent
Swamy

(10) Patent No.: US 10,783,036 B2
(45) Date of Patent: Sep. 22, 2020

(54) STORAGE SYSTEM STRIPE GROUPING USING MULTIPLE LOGICAL UNITS

(71) Applicant: Seagate Technology LLC, Cupertino, CA (US)

(72) Inventor: Vijay Nanjunda Swamy, Bangalore Karnataka (IN)

(73) Assignee: Seagate Technology LLC, Fremont, CA (US)

( * ) Notice: Subject to any disclaimer, the term of this patent is extended or adjusted under 35 U.S.C. 154(b) by 50 days.

(21) Appl. No.: 16/165,037

(22) Filed: Oct. 19, 2018

(65) Prior Publication Data
US 2020/0125444 A1   Apr. 23, 2020

(51) Int. Cl.
| G06F 11/00 | (2006.01) |
| G06F 11/10 | (2006.01) |
| G06F 3/06 | (2006.01) |
| G06F 12/10 | (2016.01) |

(52) U.S. Cl.
CPC .......... *G06F 11/1076* (2013.01); *G06F 3/064* (2013.01); *G06F 3/0619* (2013.01); *G06F 3/0689* (2013.01); *G06F 12/10* (2013.01); *G06F 2212/1008* (2013.01); *G06F 2212/1032* (2013.01)

(58) Field of Classification Search
CPC .... G06F 11/1076; G06F 3/0619; G06F 3/064; G06F 3/0689; G06F 12/10; G06F 2212/1008; G06F 2212/1032
USPC ....... 714/800, 804, 763, 770, 772, 776, 769, 714/767, 757
See application file for complete search history.

(56) References Cited

U.S. PATENT DOCUMENTS

| 5,223,993 | A | 6/1993 | Squires et al. |
| 5,293,282 | A | 3/1994 | Squires et al. |
| 5,355,486 | A | 10/1994 | Cornaby |
| 6,678,120 | B2 | 1/2004 | Money |
| 7,102,842 | B1 | 9/2006 | Howard |
| 7,710,683 | B2 | 5/2010 | Craig et al. |
| 7,961,435 | B2 | 6/2011 | Lee |
| 9,830,939 | B1 | 11/2017 | Hamilton |
| 9,911,442 | B1 | 3/2018 | Kharisov et al. |
| 10,037,779 | B1 | 7/2018 | Mendonsa et al. |
| 10,043,543 | B1 | 8/2018 | Buch et al. |
| 10,049,691 | B1 | 8/2018 | Gaertner et al. |
| 2002/0039259 | A1 | 4/2002 | Koyama et al. |
| 2015/0160999 | A1* | 6/2015 | Seo ........................ G06F 11/072 714/6.24 |

(Continued)

OTHER PUBLICATIONS

"Seagate to Double HDD Speed With Multi-Actuator Technology", tomshardware.com, Available from: https://www.tomshardware.com/news/hdd-multi-actuator-heads-seagate,36132.html, tom's Hardware, Paul Acorn, 3 pages, Dec. 18, 2017.

(Continued)

*Primary Examiner* — Christine T. Tu
(74) *Attorney, Agent, or Firm* — Kagan Binder, PLLC

(57) ABSTRACT

A method includes accessing at least three storage devices each including a first and a second logical unit stored therein. The method also includes grouping the respective first and second logical units of each of the at least three storage devices into a first striped scheme. The method also includes grouping the respective first logical unit of each of the at least three storage devices into a second striped scheme with parity.

20 Claims, 12 Drawing Sheets

(56) References Cited

U.S. PATENT DOCUMENTS

2017/0031791 A1* 2/2017 Pan .................... G06F 11/1662
2018/0226091 A1   8/2018 Tan et al.
2019/0188099 A1* 6/2019 Roberts .............. G06F 11/1092

OTHER PUBLICATIONS

"Will multi-actuators save the disk drive?", zdnet.com, Available from: https://www.zdnet.com/article/will-multi-actuators-save-the-disk-drive/, ZDNet, Robin Harris, 10 pages, Dec. 29, 2017.

* cited by examiner

STORAGE SYSTEM STRIPE GROUPING USING MULTIPLE LOGICAL UNITS

SUMMARY

Challenges relating to storage device failures, such as arising from multi-actuator, multi-LUN HDDs, can be overcome by implementing a combination of nested RAID techniques, such as RAID 0 and RAID 5 techniques, as applied to an array of HDDs each including at least two LUNs. An array of three dual-actuator HDDs each contain a first and a second LUN. The first LUNs of each respective drive and the second LUNs of each respective drive can each form a RAID 5 group, thus allowing and enabling a RAID 0+5 layout using only three dual-actuator HDDs (or other dual-LUN storage devices), and alleviating storage integrity issues related to implementing RAID on such multi-actuator or multi-LUN drives.

In a first aspect of the present disclosure, a method is disclosed. According to the first aspect, the method includes accessing at least three storage devices each including a first and a second logical unit stored therein. The method also includes grouping the respective first and second logical units of each of the at least three storage devices into a first striped scheme. The method also includes grouping the respective first logical unit of each of the at least three storage devices into a second striped scheme with parity.

In a second aspect of the present disclosure, a system is disclosed. According to the second aspect, the system includes a hardware processor operatively connected to a memory. According to the second aspect, the system is configured to perform various steps. A step to be performed include accessing at least three storage devices each including a first and a second logical unit stored therein. Another step to be performed includes grouping the respective first and second logical units of each of the at least three storage devices into a first striped scheme. Yet another step to be performed includes grouping the respective first logical unit of each of the at least three storage devices into a second striped scheme with parity.

In a third aspect of the present disclosure, a computer program product for managing data in a redundant array of independent disks (RAID) system is disclosed. The computer program product includes a computer-readable storage device having a computer-readable program stored therein, where the computer-readable program, when executed on a computing device improves the computing device and causes the computing device to access at least three storage devices each including a first and a second logical unit stored therein. The computer-readable program, when executed on a computing device improves the computing device and also causes the computing device to group the respective first and second logical units of each of the at least three storage devices into a first striped scheme. The computer-readable program, when executed on a computing device improves the computing device and also causes the computing device to group the respective first logical unit of each of the at least three storage devices into a second striped scheme with parity.

These and various other features and advantages will be apparent from a reading of the following detailed description.

BRIEF DESCRIPTION OF THE DRAWINGS

Other important objects and advantages of the present invention will be apparent from the following detailed description of the invention taken in connection with the accompanying drawings.

DETAILED DESCRIPTION

Figure 1:
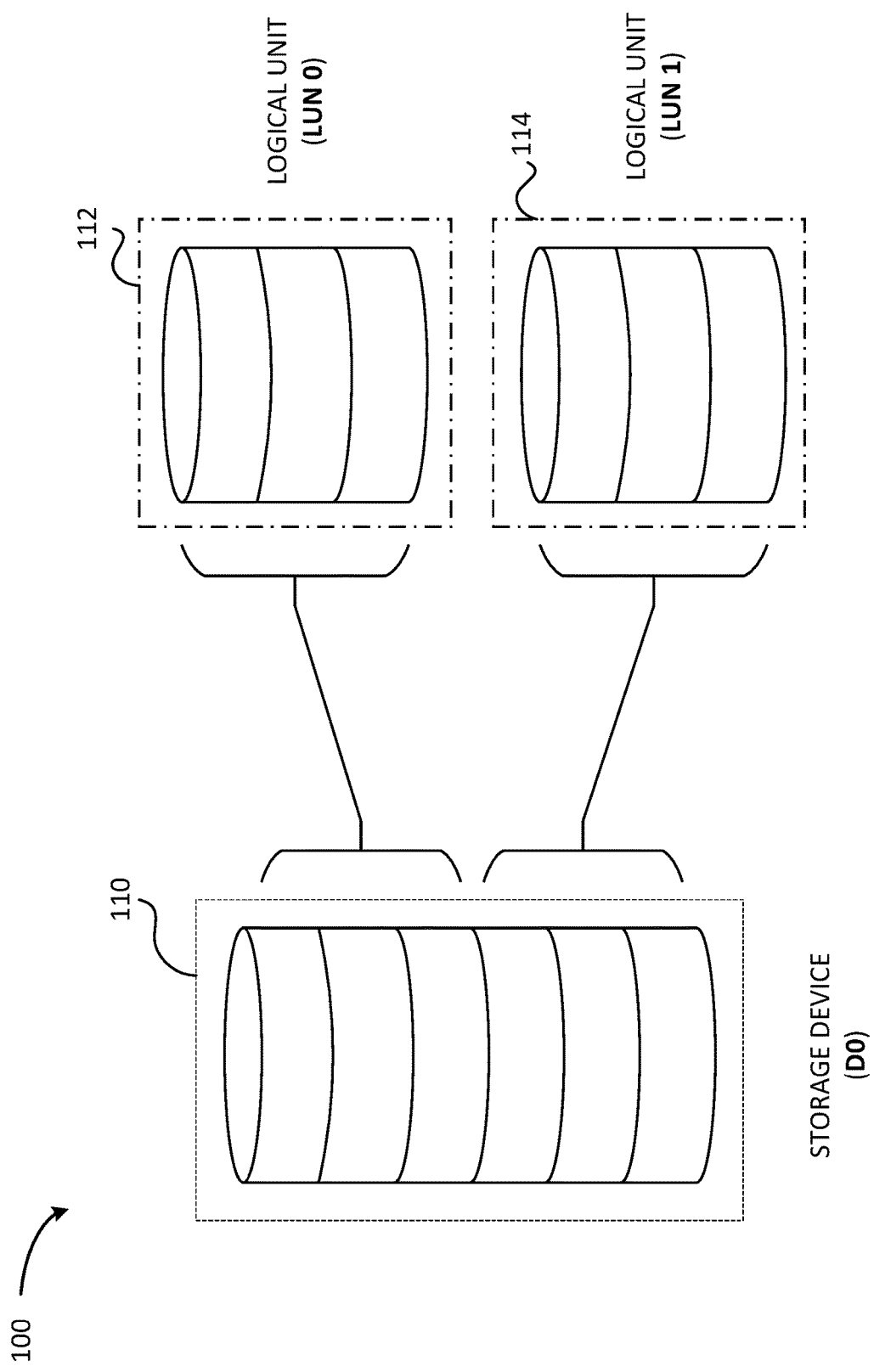
FIG. 1 is a block diagram of a storage system that includes a storage device including at least two logical units, according to various embodiments.

In general, this case relates to memory and data management within redundant array of independent disk (RAID) storage systems. In more detail, this case relates to implementing improved RAID techniques in a "stacked" fashion in order to facilitate RAID use with storage devices that include multiple logical units on each storage device, such as multi-actuator hard-disk drives (HDDs). Although various embodiments discussed herein refer to the particular example of an array of dual-actuator HDDs, this is merely put forth as one possible example. In other embodiments, storage devices can include HDDs having more than two actuators (and therefore more than two logical units), or other storage media that employ multiple logical units stored on a single storage device other than HDDs, such as solid-state drives, virtual drives, and the like.

Utilizing RAID schemes in storage systems can have benefits that are either advantageous to disk performance (read/write access time and/or throughput), data integrity (mirroring data in case of fault), or both. RAID can utilize various block "striping" techniques in order to improve data integrity, performance, or both.

As HDDs become ever larger in areal density and overall capacity, such as with the advent of heat-assisted magnetic recording (HAMR) technologies, reading, writing, and access latency speeds have become a relatively weak link in modern HDD technology. Therefore, a need exists to improve read, write, and access performance in HDDs (and other storage media).

Multiple-actuator HDDs have significantly improved I/O throughput for an individual HDD. In various embodiments, each multi-actuator HDD contains two (or more) separate logical units, also referred to as logical unit numbers (LUNs). By including two or more unique LUNs within a single physical multi-actuator HDD, new challenges arise with respect to data management and integrity. In particular, where a single physical HDD contains two LUNs, a single LUN failing can also lead to a failure of the other LUN of the same physical HDD. In some embodiments the various LUNs of an HDD are stacked as two sets of concentric, but stacked platters. Also in some embodiments, the multiple actuators are also stacked in correspondence to the stacked platters and can all rotate independently but on a same axis of actuator rotation. In other embodiments, the multiple actuators can be rotatable separate from one another and according to a different axis. In yet other embodiments, the multiple LUNs of a multi-actuator HDD can be intermixed according to a virtual disk layer or a physical disk layer.

Multi-actuator HDDs can substantially improve HDD performance when compared to single-actuator HDDs. For example, various RAID techniques, such as RAID 0 (striping), RAID 1 (mirroring), or various RAID 4, 5, 6 or striping with parity schemes can be implemented on a single HDD using the multiple LUNs simultaneously, but within a single HDD casing. With numerous possible benefits of multi-actuator HDDs come some potential drawbacks. One particular drawback includes a situation where a multi-actuator encounters a failure. It is known that HDDs have failures from time to time. At present, a failed HDD can be swapped out for a "hot spare" HDD in order to rebuild the failed HDD into a replacement HDD in various RAID schemes.

In particular, a single multi-actuator HDD that includes two or more LUNs that suffers a failure can cause data integrity problems, especially if more than one of the HDD's LUNs are caused to fail simultaneously. For example, a multi-actuator HDD housing can have a common power supply for the multiple actuators and for the corresponding multiples LUNs that contain data. If the common power supply fails, all the LUNs would all lose power at once and fail. If a multi-actuator HDD used in a usual RAID 5 scheme were to suffer a failure, then the equivalent data loss would include the loss of two stripes (two LUNs) at once. This would leave little or no room for fault tolerance. As described herein, employing a RAID 0+5 scheme across several multi-actuator HDD allows a rebuild of a failed multi-actuator (or dual-LUN) HDD.

Other possible causes of a multi-actuator HDD failure can include a read/write head crash, in which debris resulting from the read/write head crash can interrupt or interfere with read/write operations from other heads, platters, or other components or sensors within the subject multi-actuator HDD. As with losing power supply, such a read/write head crash could also disable each of multiple LUNs of a multi-actuator, multi-LUN HDD. As yet another example of a drive-wide failure, a user or system could accidentally or mistakenly pull out and remove a multi-actuator HDD from a storage system. As with the other possible reasons for an HDD failure, above, this would likely result in HDD data unavailability and eventual data loss, particularly if the removed HDD is not immediately or eventually reseated. In present RAID 5 schemes, these various drive-wide or system-wide HDD problems can occur. However, in the presently disclosed stacked, RAID 0+5 (and the like) schemes, such drive-wide failures can be seamlessly withstood with relatively less complication and less chance for data loss due to concurrent failures during storage system rebuild. The above HDD failures can further be extrapolated to, for example, RAID 0+6 scheme when two multi-actuator HDDs are affected concurrently or one after the other sequentially before a storage system re-build operation completes.

A single LUN failing of a multi-actuator HDD may not cause a failure to its second (or subsequent) LUN unless these LUNs are physically, logically, or otherwise operatively interconnected. A stacked RAID scheme, as described herein, can respond to a single LUN failure. The failed LUN can be rebuilt using a spare LUN (e.g., LUN 0/1) on a spare multi-actuator (multi-LUN) HDD. See FIGS. 6A and 6B in particular for examples of rebuild operations, according to various embodiments.

Existing RAID 5 schemes do not provide for a dual-LUN storage device failure. Standard RAID 6 would also have drawbacks if implemented to attempt to get fault tolerance when using a dual-LUN storage device. Compared to applying a typical RAID 6 scheme to an array of multi-LUN storage device, a RAID 0+5 provides fault tolerance even if an entire dual-LUN HDD fails. Therefore, another beneficial aspect of the present disclosure is that fewer physical storage devices (e.g., HDDs) may be needed to implement various RAID schemes. This can save on materials, complexity, space, and other aspects when implemented in a RAID-based storage system.

As used herein, various terms are defined as follows:

Stripe: a stripe as used in disk striping is employed in a process of dividing a body of data into blocks and spreading the data blocks across multiple storage devices, such as HDDs or solid-state drives (SSDs). A stripe includes data divided across the set of storage devices (or logical units) as a stripe, which refers to the stripe on an individual storage device. RAID 0 is another term for basic disk striping. Disk striping can be used without employing a RAID in some cases.

Redundant array of independent disks (RAID): RAID uses disk striping to distribute and store data across multiple physical drives in a non-parity, non-fault-tolerant manner, in basic RAID 0 (striping) form. Disk striping with RAID can produce redundancy and reliability. For instance, RAID 4 (single with parity) and RAID 5 (single with distributed parity) can use parity blocks to protect against a disk failure, and RAID 4, 5, or 6 can be combined with RAID 0 to give a combination of speed of access and redundancy of data storage. RAID 6 can utilize two drives for double distributed parity and can protect against two simultaneous drive failures. RAID 1 can refer to simple data mirroring, where data is fully copied from one disk to another to give redundancy and access at the expense of having twice the physical drives per amount of usable data storage. Other RAID schemes can be employed, and are known in the art.

Logical block addressing (LBA): LBA is a scheme used to specify the location of blocks of stored data on a storage device. LBA is also a linear addressing scheme, and LBA blocks can be located by an integer index, numbered as LBA (block) 0, 1, 2, etc. LBA data blocks can be referred to as LBAs, herein. In addition, LBAs can also represent individual strips of data stripes, herein. LBA can be utilized for RAID schemes, among other data management schemes.

Logical unit number (LUN): a LUN, is a number used to identify a logical unit, which can be a device addressed by a small-computer system interface (SCSI) protocol or storage area network (SAN) protocol. A LUN can also refer to the logical unit itself. A LUN can be used with any device that supports read/write operations, such as a logical disk created by a SAN. User LUN or LUN space can be LUN or LUN space of a particular user or multiple users. A LUN can include multiple data blocks accessed using, e.g., LBA techniques.

Page: a page is a unit of memory storage that is composed of one or more memory blocks, such as LBAs. A page can be selected such that an operating system (OS) can process the entire page in one operation. Therefore, pages can vary in size from very small or very large depending on a computer configuration.

Multiple-actuator/multiple-LUN storage device: a multiple-LUN storage device (of which a multiple-actuator HDD is one possible example) includes more than one LUN within a single storage device. This can entail a storage device that acts essentially as if it contained two separate and independent storage devices within a single construct or housing.

Stacked RAID: Stacked RAID is a nested-RAID scheme that can be implemented on three or more multiple-LUN storage devices in a storage system such that the storage system can withstand a failure of at least one multiple-LUN storage device. Various examples of stacked RAID embodiments include RAID 0+4, RAID 0+5, and RAID 0+6, among many others.

Virtual LBA: a virtual LBA represents an offset within a virtual LUN (as seen by host). Each LBA can be, for example, 512 bytes in size.

Virtual block number: a virtual block number represents a virtual LBA in terms of block size where virtual block number is equivalent to a virtual LBA/block size. An example virtual LBA/block size is 4 MB. Virtual block numbers can be visible and/or accessible to user via a LUN. A user-visible <LBA, number of blocks> can translate to a virtual block (LBA/block size) that can be looked up in a mapping table to get the corresponding physical blocks.

Physical block number: a physical block number represents a physical LBA in terms of block size where physical block number is equivalent to a physical LBA/block size. An example physical LBA/block size is 4 MB.

Host side and disk side: for the purposes of this disclosure, "host side" refers to a host as defined in contrast to a disk, as in "disk side." In a network a host can be a device, such as a hard-disk drive (HDD) or an HDD controller, that has established a connection to a network an internet protocol (IP) address. For disk side, an operation can occur at an actual disk drive instead of at the network host level, and the disk may not be assigned a unique IP address.

Parity: RAID-based storage systems can employ an error protection scheme known as parity. Parity is used to provide fault tolerance in a given set of data. The "exclusive or" logical operation outputs true only when inputs differ, and is commonly abbreviated as XOR. XOR is what is predominantly used in RAID technology in RAID 4 and RAID 5 for parity. These constructs can aid in deducing either A(n) or B(n) block using Ap/Ap' or Bp/Bp' parity blocks respectively, as used herein. According to some embodiments, parity blocks Ap, Bp, Ap' and Bp' can be based on a simple XOR logical operation as used in other RAID schemes described herein.

However, for RAID 6-type schemes, two separate parities can be used based on addition and/or multiplication in complex mathematical logical operations. The second parity, referred to as "q" or "q'" (q-prime) herein, can also calculated based on industry standards. Various q-prime counters can be based on a particular Galois field or Reed-Solomon error correction, among others, as is known in the art.

FIG. 1 is a block diagram of a storage system 100 that includes a storage device including at least two logical units, according to various embodiments.

A storage system can include one or more storage devices 110. As shown, a single storage device 110 is designated as storage device D0. Storage device 110 can include multiple LUNs 112 and 114, and each LUN can include multiple data blocks to be addressed using, e.g., LBA. In some embodiments, each LUN could include three data blocks that can be used to store data or parity data, but each LUN could include any number of data blocks according to particular implementation and virtual or physical characteristics of each storage device 110, LUN 112/114, etc.

As shown, storage device 110 includes two LUNs 112 and 114, which can be designated as LUN 0 and LUN 1, respectively. Each of LUN 0 and LUN 1 can include one or more data blocks therein, which can be utilized in various embodiments for block-level data striping according to various RAID schemes. Although block-level striping is used throughout the present application for simplicity, it is also contemplated that in other embodiments any other data chunk size can alternatively be used, including bit, byte, page, other, or any suitable combination(s) thereof.

Storage device 110 can represent a whole or partial HDD in various embodiments. Furthermore, the logical units 112 and 114 can each correspond to a portion of an HDD that is accessible by an actuator within a multi-actuator HDD.

FIGS. 2A-2D are block diagrams for a storage system that include three storage devices each including at least two logical units and striped according to various stacked RAID schemes with parity or distributed parity, according to various embodiments.

Figure 2A:
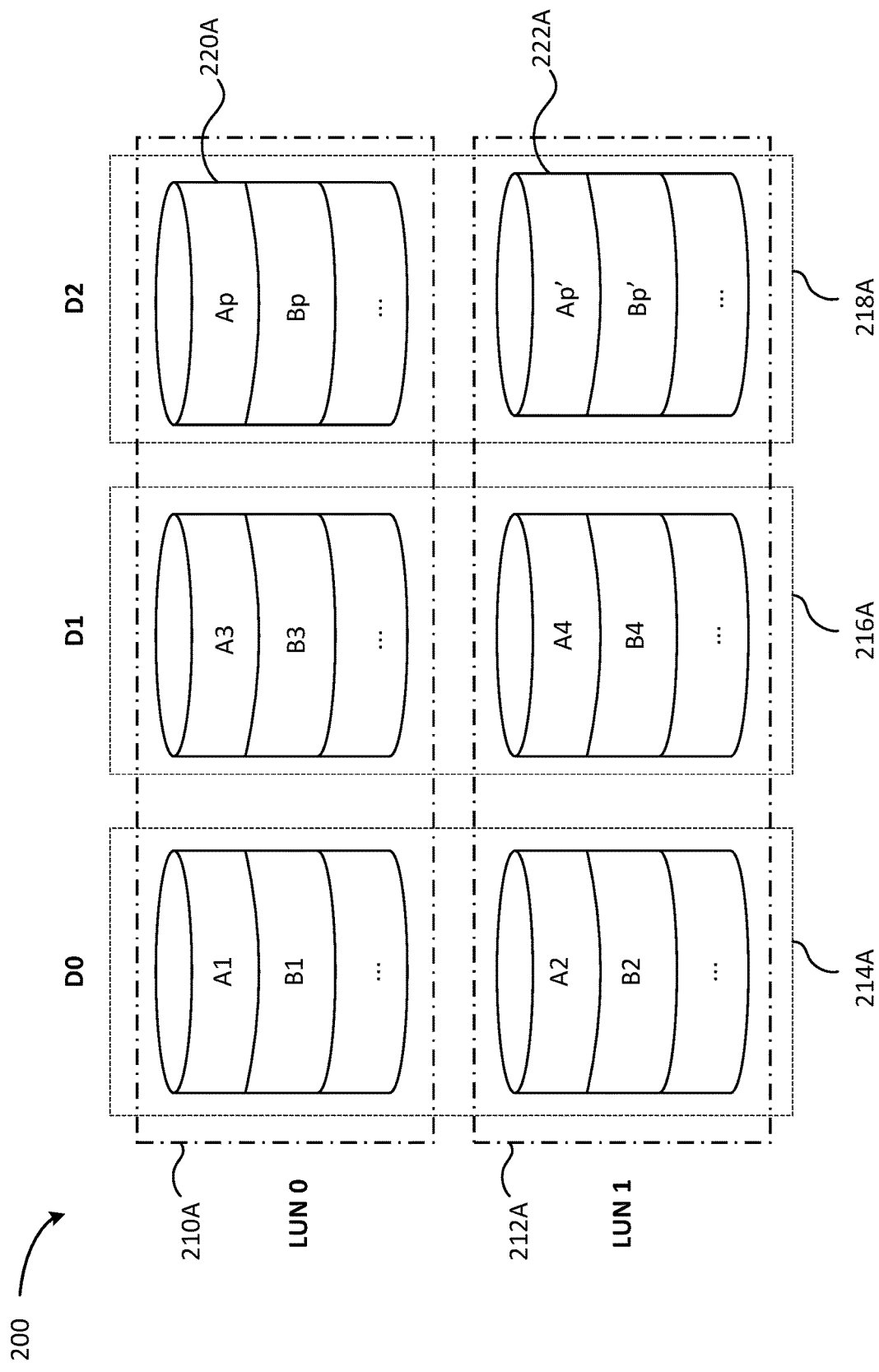
FIG. 2A is a block diagram of a storage system that includes three storage devices each including at least two logical units and striped according to a first stacked RAID scheme with parity, according to various embodiments.

FIG. 2A is a block diagram of a storage system 200 that includes three storage devices each including at least two logical units and striped according to a first stacked RAID scheme with parity, according to various embodiments.

According to a first stacked RAID scheme with (non-distributed, dedicated storage device) parity, three storage devices 214A, 216A, and 218A (D0, D1, and D2) are configured to each include at least two LUNs, here LUN 0 210A and LUN 1 212A. Therefore, as shown, a total of six LUNs of the three storage devices are shown in total. Examples of LUNs that correspond to an individual storage device is shown at 220A and 222A, which represent a LUN 0 and a LUN 1 of storage device D2, 218A, respectively. As shown, system 200 can be a nested RAID 0+4 configuration, being both striped across the various storage devices without parity (according to data blocks with prefix A, B, etc.) and striped across the various storage devices with parity.

As shown, the parity blocks end with the suffix p or p-prime (p'). Parity block Ap can represent an XOR parity block for data blocks A1 and A3, and parity block Ap' can represent an XOR parity block for data blocks A2 and A4, as shown. Parity block Bp can represent an XOR parity block for data blocks B1 and B3, and parity block Bp' can represent an XOR parity block for data blocks B2 and B4, as shown. Parity blocks Ap, Ap', Bp, and Bp' can be suitable to implement a RAID 4 type striping with non-distributed block-level striping, as shown. Therefore, also as shown, storage device D2 218A can represent a dedicated parity storage device such as an HDD.

As shown, each LUN of each storage device can include one or more data blocks, such as LBA blocks. According to the shown embodiment, A1-A4 and B1-B4 are each single stripes that are spread across the various storage devices. LUN 0 210A of storage device D0 214A includes at least two data blocks as shown, with storage blocks A1, B1, etc. included within the LUN 0 of D0. Likewise, LUN 1 of D0 also includes at least two data blocks, including A2 and B2. Other suitable parity schemes are also contemplated.

As described herein, the shown stacked RAID 0+4 configuration can allow for either of D0 or D1 to fail without incurrent a data loss within storage system 200. Furthermore, in addition to aspects related to mitigating or avoiding data loss in a RAID-based storage system, according to present embodiments the storage system 200 can continue to serve data by computing missing block(s) using the one or more parity block(s). In some embodiments where there is a spare storage device, then the storage system 200 can concurrently perform rebuild of an entire storage device or just the lost or corrupted data blocks from LUN 0 and/or LUN 1 of the failed storage device.

Figure 2B:
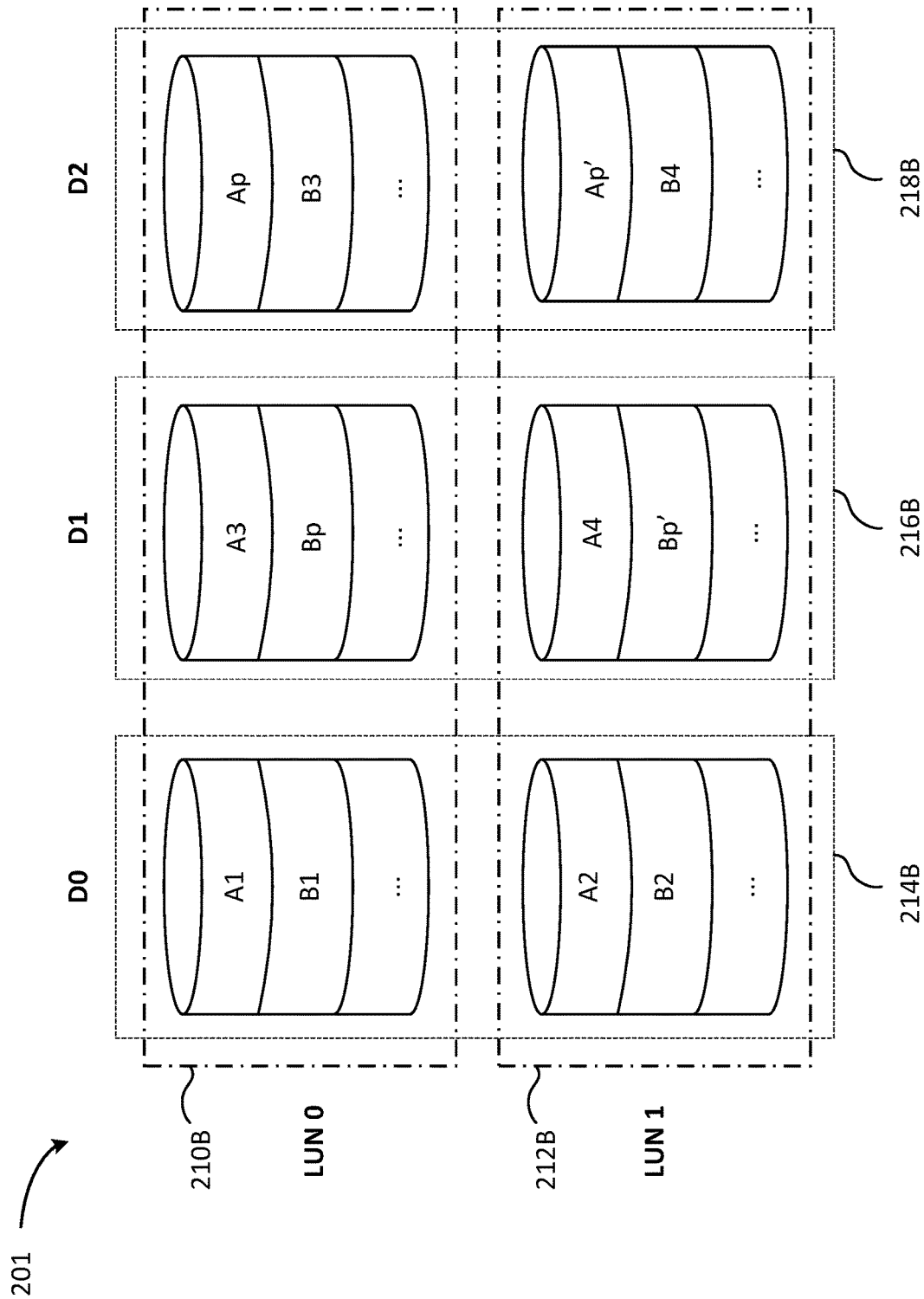
FIG. 2B is a block diagram of a storage system that includes three storage devices each including at least two logical units and striped according to a second stacked RAID scheme with distributed parity, according to various embodiments.

FIG. 2B is a block diagram of a storage system 201 that includes three storage devices each including at least two logical units and striped according to a second stacked RAID scheme with distributed parity, according to various embodiments.

Storage system 201 of FIG. 2B is similar to the storage system 200 of FIG. 2A, but with an alternate striping pattern among the storage devices D0, D1, and D2 according to a distributed parity, RAID 5 type configuration in addition to a RAID 0 type configuration according to the multiple LUNs of each storage device. Storage system 201, as shown, is implemented according to a RAID 0+5 scheme instead of a RAID 0+4 scheme as in storage system 200. A RAID 5-based storage scheme can have the feature of distributed parity across the various storage devices instead of concentrated parity on a single storage device, such as storage device D2 of FIG. 2A. This can be advantageous in terms of supporting a failure of D0, D1, or D2, instead of only supporting a failure of the non-parity drives D0 and D1 in storage system 200 of FIG. 2A.

As shown, parity block Ap can represent an XOR parity block for data blocks A1 and A3, and parity block Ap' can represent an XOR parity block for data blocks A2 and A4, as shown. Parity block Bp can represent an XOR parity block for data blocks B1 and B3, and parity block Bp' can represent an XOR parity block for data blocks B2 and B4, as shown. Parity blocks Ap, Ap', Bp, and Bp' can be suitable to implement a RAID 5 type striping with distributed block-level striping, as shown. Therefore, also as shown, storage device D2 218B can represent a multi-use, parity and data, storage device or HDD. Other suitable parity schemes are also contemplated.

Figure 2C:
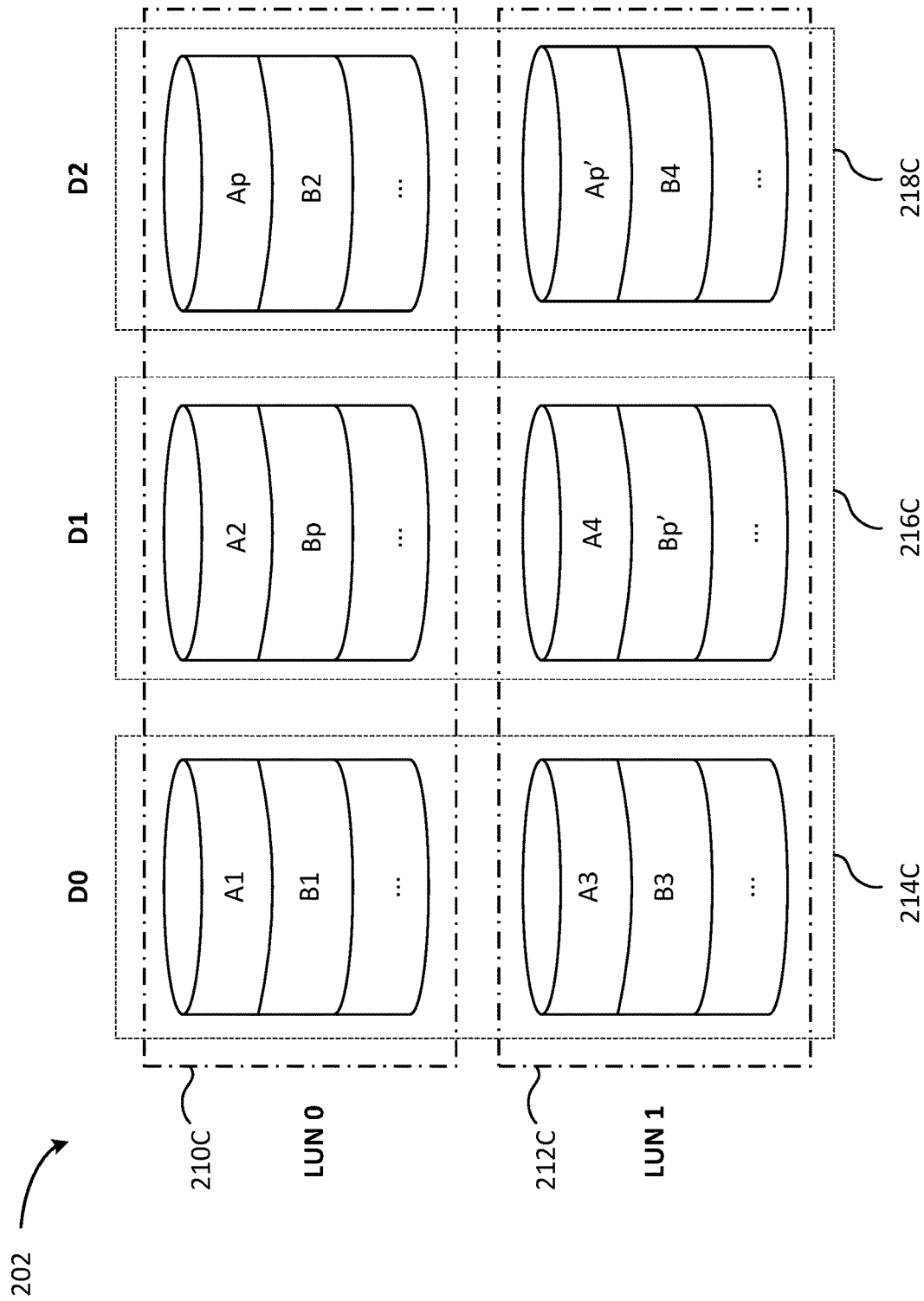
FIG. 2C is a block diagram of a storage system that includes three storage devices each including at least two logical units and striped according to a third stacked RAID scheme with distributed parity, according to various embodiments.

FIG. 2C is a block diagram of a storage system 202 that includes three storage devices each including at least two logical units and striped according to a third stacked RAID scheme with distributed parity, according to various embodiments.

Storage system 202 of FIG. 2C is similar to the storage system 201 of FIG. 2B, but with an alternate striping pattern among the storage devices D0, D1, and D2. Storage system 202, as shown, is implemented according to a RAID 0+5 as in storage system 201. A RAID 5-based storage scheme can have the feature of distributed parity across the various storage devices instead of concentrated parity on a single storage device, such as storage device D2 of FIG. 2A. This can be advantageous in terms of supporting a failure of D0, D1, or D2, instead of only supporting a failure of the non-parity drives D0 and D1 in storage system 200 of FIG. 2A.

As shown, parity block Ap can represent an XOR parity block for data blocks A1 and A2, and parity block Ap' can represent an XOR parity block for data blocks A3 and A4, as shown. Note that the parity blocks for storage system 202 correspond to different data blocks than for storage systems 200 or 201. Parity block Bp can represent an XOR parity block for data blocks B1 and B2, and parity block Bp' can represent an XOR parity block for data blocks B3 and B4, as shown. Parity blocks Ap, Ap', Bp, and Bp' can be suitable to implement a RAID 5 type striping with distributed block-level striping, as shown. Other suitable parity schemes are also contemplated.

Figure 2D:
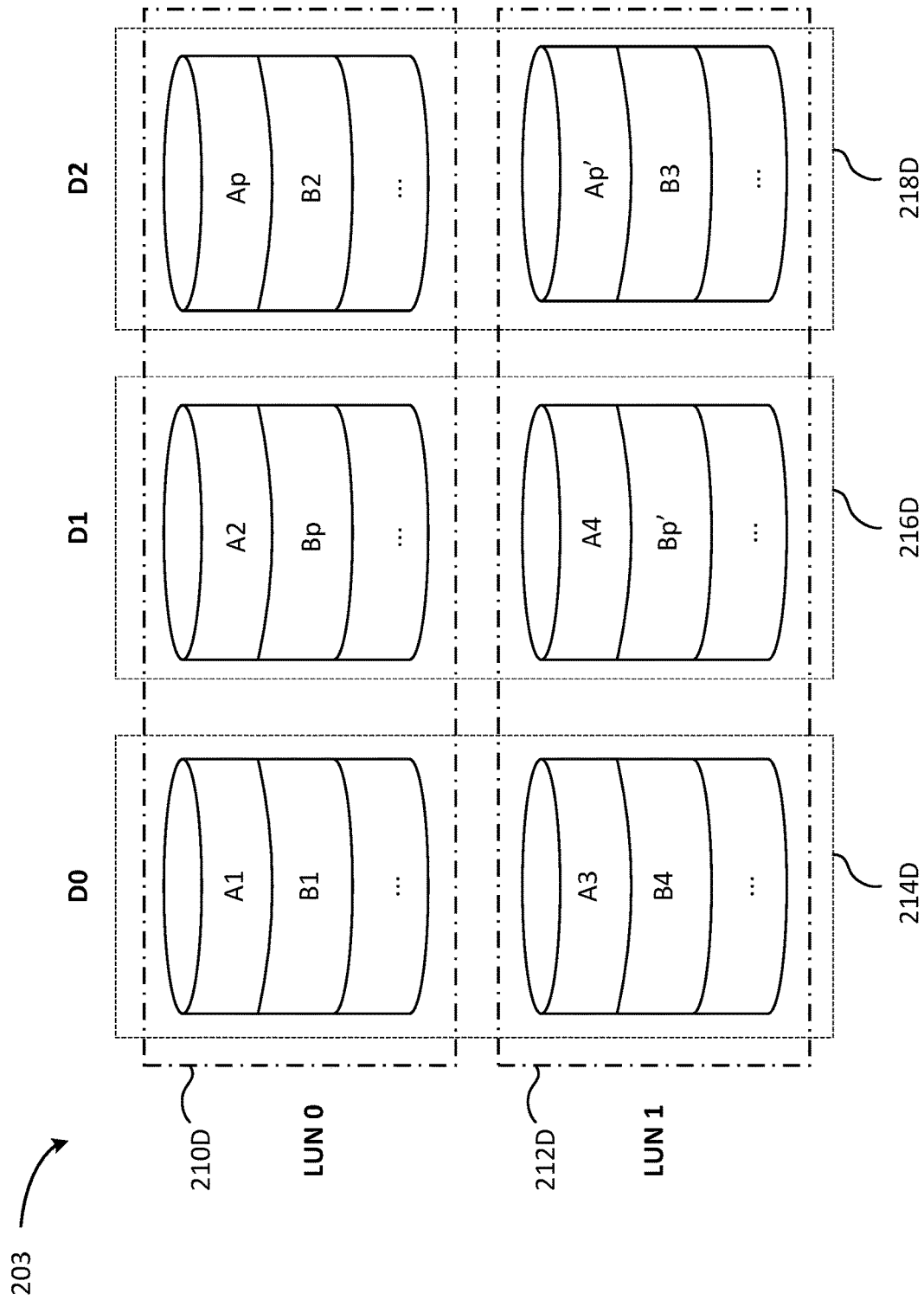
FIG. 2D is a block diagram of a storage system that includes three storage devices each including at least two logical units and striped according to a fourth stacked RAID scheme with distributed parity, according to various embodiments.

FIG. 2D is a block diagram of a storage system 203 that includes three storage devices each including at least two logical units and striped according to a fourth stacked RAID scheme with distributed parity, according to various embodiments.

Storage system 203 of FIG. 2D is similar to the storage system 202 of FIG. 2C, but with an alternate striping pattern among the storage devices D0, D1, and D2. Storage system 203, as shown, is implemented according to a RAID 0+5 as in storage systems 201 and 202. A RAID 5-based storage scheme can have the feature of distributed parity across the various storage devices instead of concentrated parity on a single storage device, such as storage device D2 of FIG. 2A. This can be advantageous in terms of supporting a failure of D0, D1, or D2, instead of only supporting a failure of the non-parity drives D0 and D1 in storage system 200 of FIG. 2A. FIG. 2D illustrates that there are numerous different ways in which to stripe three storage devices each having two LUNs.

As shown, parity block Ap can represent an XOR parity block for data blocks A1 and A2, and parity block Ap' can represent an XOR parity block for data blocks A3 and A4, as shown. Note that the parity blocks for storage system 203 correspond to the same data blocks as in storage system 202. Parity block Bp can represent an XOR parity block for data blocks B1 and B2, and parity block Bp' can represent an XOR parity block for data blocks B3 and B4, as shown. Parity blocks Ap, Ap', Bp, and Bp' can be suitable to implement a RAID 5-type striping with distributed block-level striping, as shown. Other suitable parity schemes are also contemplated.

Figure 3A:
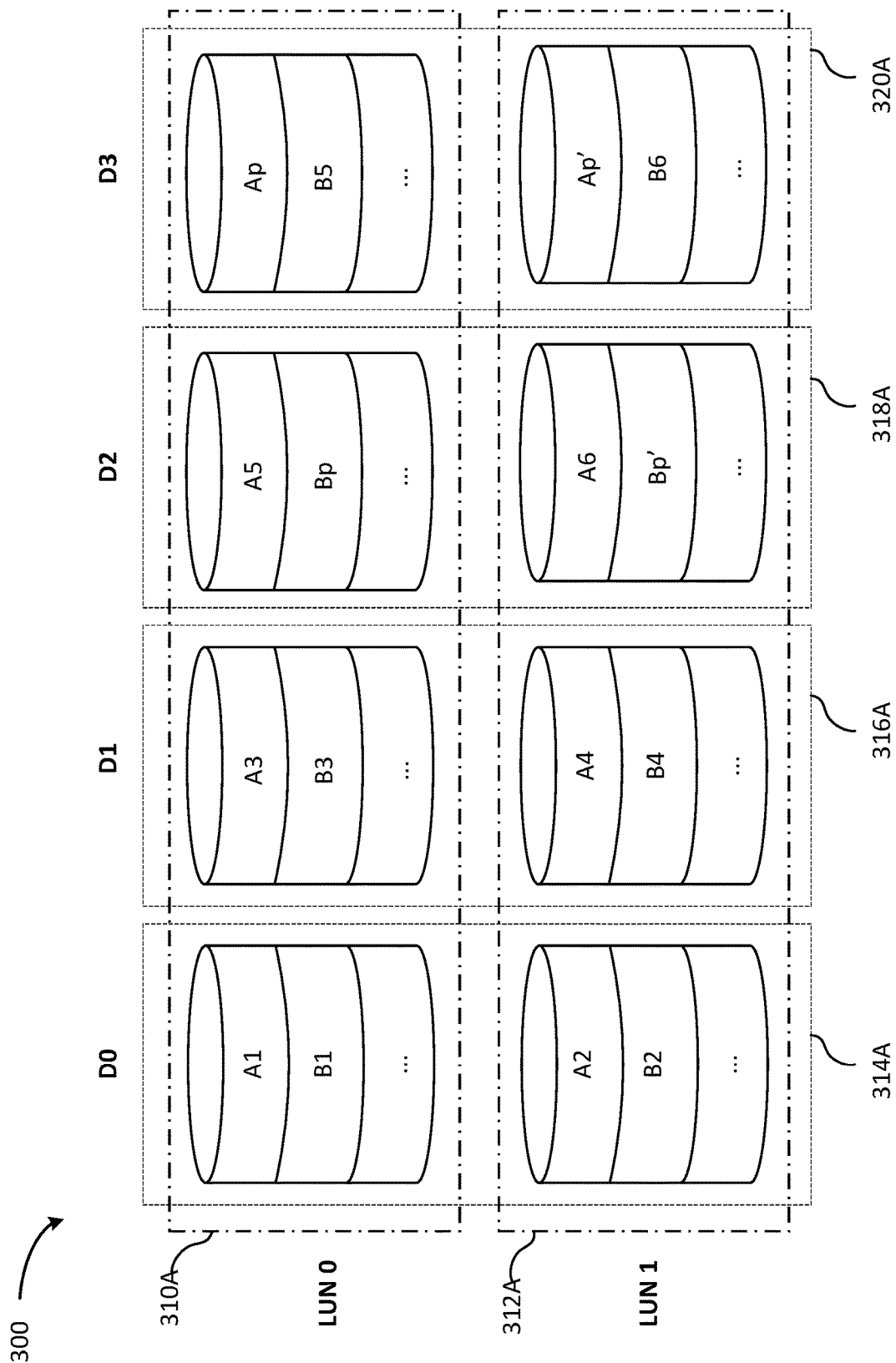
FIG. 3A is a block diagram of a storage system that includes four storage devices each including at least two logical units and striped according to a stacked RAID scheme with distributed parity, according to various embodiments.

FIG. 3A is a block diagram of a storage system 300 that includes four storage devices each including at least two logical units and striped according to a stacked RAID scheme with distributed parity, according to various embodiments.

The storage system 300 of FIG. 3A demonstrates that a stacked, nested RAID 0+5 scheme can also be implemented on an array of four multiple-actuator or multiple-LUN storage devices D0 314A, D1 316A, D2 318A, and D3 320A. In fact, as shown, a smaller percentage (e.g., 25% vs. 33%) of the storage system 300's total storage space is allocated to parity blocks, which can mean that implementing the disclosed methods on a greater number of storage devices can be beneficial in certain embodiments. As shown, LUN 0 310A includes a LUN 0 of storage devices D0-D3, and LUN 1 312A includes a LUN 1 of the same storage device D0-D3.

As shown, parity block Ap can represent an XOR parity block for data blocks A1, A3, and A5, and parity block Ap' can represent an XOR parity block for data blocks A2, A4, and A6, as shown. Parity block Bp can represent an XOR parity block for data blocks B1, B3, and B5, and parity block Bp' can represent an XOR parity block for data blocks B2, B4, and B6, as shown. Parity blocks Ap, Ap', Bp, and Bp' can be suitable to implement a RAID 5-type striping with distributed block-level striping, as shown. Other suitable parity schemes are also contemplated.

Figure 3B:
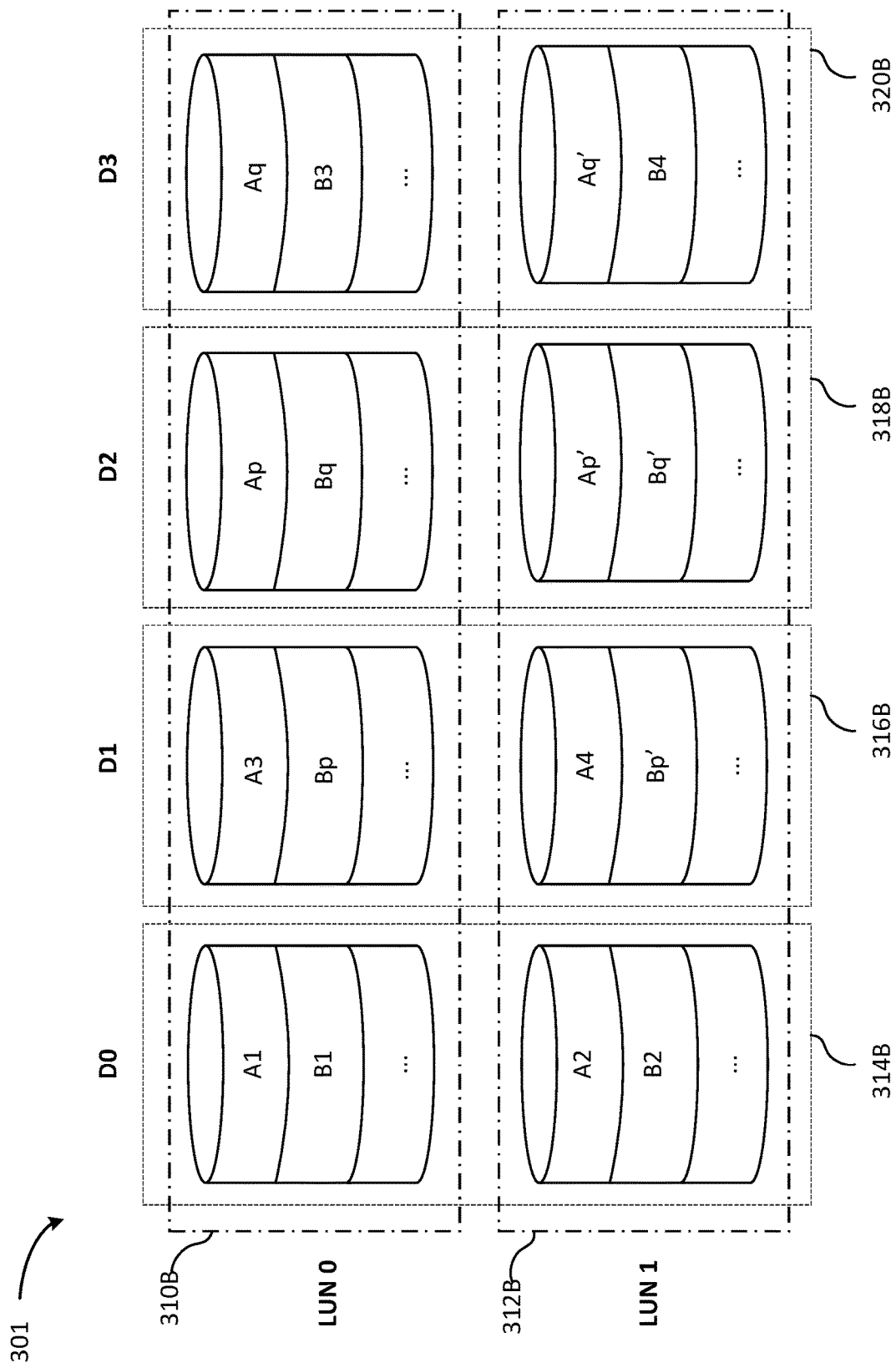
FIG. 3B is a block diagram of a storage system that includes four storage devices each including at least two logical units and striped according to a stacked RAID scheme with double-distributed parity, according to various embodiments.

FIG. 3B is a block diagram of a storage system 301 that includes four storage devices each including at least two logical units and striped according to a stacked RAID scheme with double-distributed parity, according to various embodiments.

The storage system 301 of FIG. 3B can be similar to the storage system 300 of FIG. 3A with the exception that storage system 301 utilizes a RAID 0+6, double-distributed parity scheme whereas storage system 300 instead utilizes a RAID 0+5, single distributed parity scheme. A RAID 0+6 scheme can be implemented on an array including as few as four multiple-actuator or multiple-LUN storage devices D0 314B, D1 316B, D2 318B, and D3 320B. As shown, half of the storage devices of storage system 301's total storage space can be allocated to parity blocks. As with any RAID 6 implementation in view of simpler RAID 5 options, a decision can be made whether the benefits of double-distributed parity, including the ability to have two simultaneous storage device failures, outweigh the detriments in terms of overall storage space in a system such as storage system 301. As shown, LUN 0 310B includes a LUN 0 of storage devices D0-D3, and LUN 1 312B includes a LUN 1 of the same storage device D0-D3.

As shown, parity block Ap and Aq can represent XOR parity blocks for data blocks A1 and A3, and parity blocks Ap' and Aq' can represent XOR parity blocks for data blocks A2 and A4, as shown. Parity blocks Bp and Bq can represent XOR parity blocks for data blocks B1 and B3, and parity blocks Bp' and Bq' can represent XOR parity blocks for data blocks B2 and B4, as shown. Parity blocks Ap, Ap', Aq, Aq', Bp, Bp', Bq, and Bq' can be suitable to implement a RAID 6-type striping with distributed block-level striping, as shown. Other suitable parity schemes are also contemplated. According to some embodiments, parity blocks Ap, Bp, Ap' and Bp' can be based on a simple XOR logical operation as used in other RAID schemes described herein. Various q' counters can be based on complex mathematical logical operations.

Figure 4:
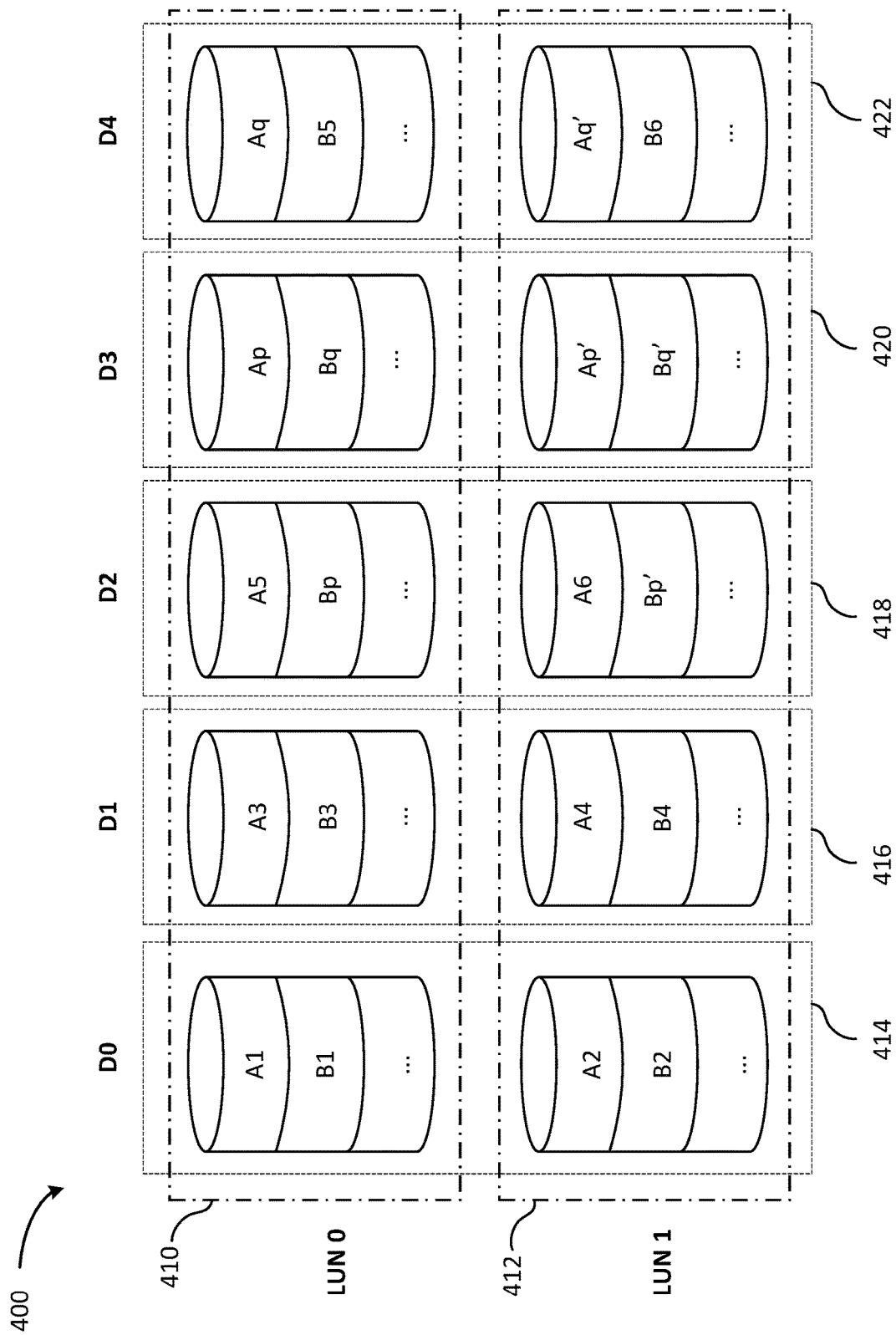
FIG. 4 is a block diagram of a storage system that includes five storage devices each including at least two logical units and striped according to a stacked RAID scheme with double-distributed parity, according to various embodiments.

FIG. 4 is a block diagram of a storage system 400 that includes five storage devices each including at least two logical units and striped according to a stacked RAID scheme with double-distributed parity, according to various embodiments.

The storage system 400 of FIG. 4 can be similar to the storage system 301 of FIG. 3B with the exception that storage system 400, as shown, utilizes a RAID 0+6, double-distributed parity scheme implemented on a storage array of five storage devices instead of four as in FIG. 3B. Although a RAID 0+6 scheme is shown, any other suitable RAID scheme could be implemented on five storage devices, such as RAID 0+4, 0+5, etc.

A RAID 0+6 scheme can be implemented on an array including as few as four multiple-actuator or multiple-LUN storage devices D0 414, D1 416, D2 418, and D3 420, but a fifth storage device D4 422 can also be included if suitable for a particular implementation. As shown, when five storage devices are utilized for the RAID 6 double-distributed parity scheme, the storage space of the overall array that is dedicated to parity is reduced to 40% instead of 50% as in FIG. 3B. As with any RAID 6 implementation, a decision should be made whether the benefits of double-distributed parity, including the ability to have two simultaneous or concurrent storage device failures, outweigh the detriments in terms of overall storage space in a system such as storage system 400. As shown, LUN 0 410 includes a LUN 0 of storage devices D0-D4, and LUN 1 412 includes a LUN 1 of the same storage device D0-D4.

As shown, parity block Ap and Aq can represent XOR parity blocks for data blocks A1, A3, and A5, and parity blocks Ap' and Aq' can represent XOR parity blocks for data blocks A2, A4, and A6, as shown. Parity blocks Bp and Bq can represent XOR parity blocks for data blocks B1, B3, and B5, and parity blocks Bp' and Bq' can represent XOR parity blocks for data blocks B2, B4, and B6, as shown. Parity blocks Ap, Ap', Aq, Aq', Bp, Bp', Bq, and Bq' can be suitable to implement a RAID 6-type striping with distributed block-level striping, as shown. Other suitable parity schemes are also contemplated. According to some embodiments, parity blocks Ap, Bp, Ap' and Bp' can be based on a simple XOR logical operation as used in other RAID schemes described herein. Various q' counters can be based on complex mathematical logical operations.

Figure 5:
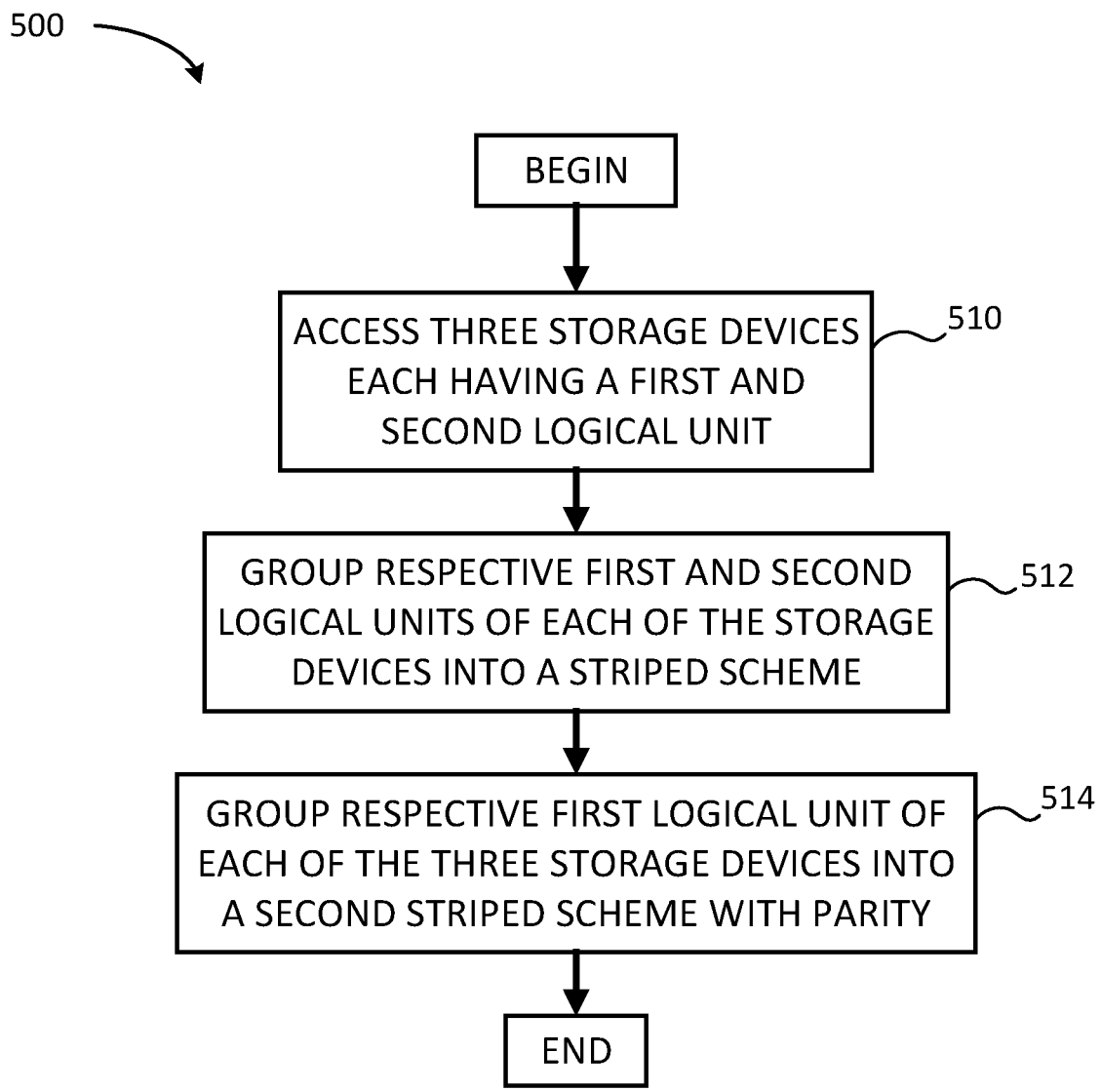
FIG. 5 is a flowchart for a process according to a stacked RAID scheme, according to various embodiments.

FIG. 5 is a flowchart for a process 500 according to a stacked RAID scheme, according to various embodiments.

According to the present disclosure, various methods and operations can be used to implement stacked RAID schemes for multi-LUN or multi-actuator storage devices. Process 500 is one example of a method for implementing a stacked RAID scheme. Process 500 can begin by accessing at least three storage devices each being assigned and having a first and second logical unit thereon at operation 510. Optionally, the storage devices can include at least four storage devices, e.g., if a RAID 6 scheme is to be implemented with double-distributed parity. Next, respective first and second logical units can be grouped at operation 512. According to operation 512, the respective first and second logical units can be grouped into a first striped scheme according to various RAID implementations.

At operation 514, the respective first logical unit of each of the three storage devices can be grouped into a second striped scheme with parity. Following this operation, the process may then end. According to some embodiments, the parity of the second striped scheme can be non-distributed parity among the at least three storage devices. In other embodiments, the parity among the at least three storage devices can be distributed parity according to a RAID 5 scheme. In embodiments having at least four storage devices, the parity among the storage devices can be double-distributed parity according to a RAID 6 scheme. At a further and optional operation, the respective second logical unit of each of the at least three storage devices can be grouped into a third striped scheme with parity.

According to various embodiments, the at least three storage devices can be multiple-actuator HDDs or multiple-LUN storage devices. In various embodiments, the grouping of the respective logical units of each of the at least three storage devices can be striped according to a RAID 0 or a RAID 1 scheme, among others. In yet other embodiments, the grouping of the respective logical units of each of the at least three storage devices can be according to RAID 4, 5, or 6 schemes, which can be combined with the striping with parity from among the at least three storage devices. In various embodiments, the first and second striped schemes include striping according to data and parity blocks stored on each of the at least three storage devices.

Figure 6A:
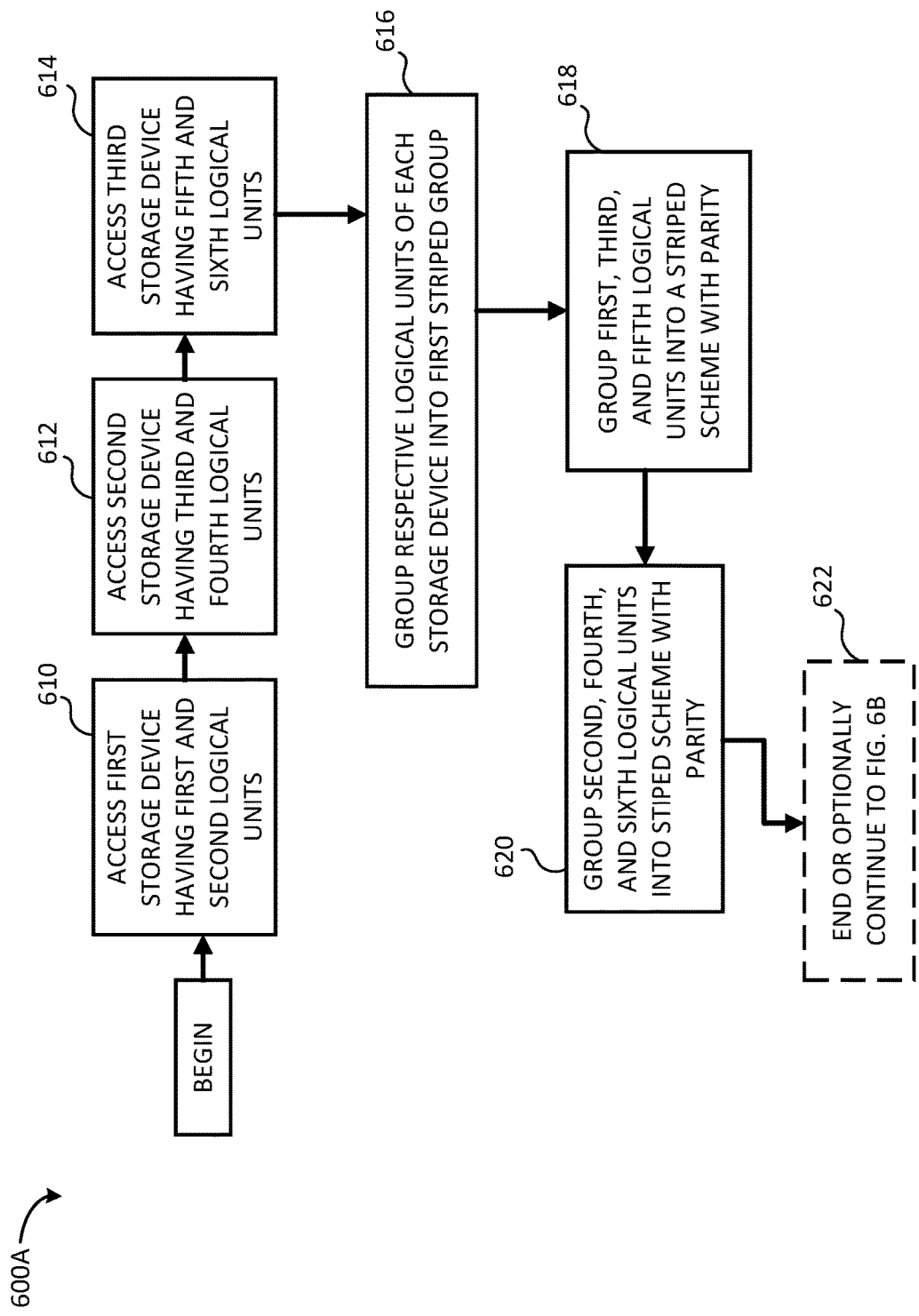
FIG. 6A is a flowchart for a process according to an alternate stacked RAID scheme, according to various embodiments.
Figure 6B:
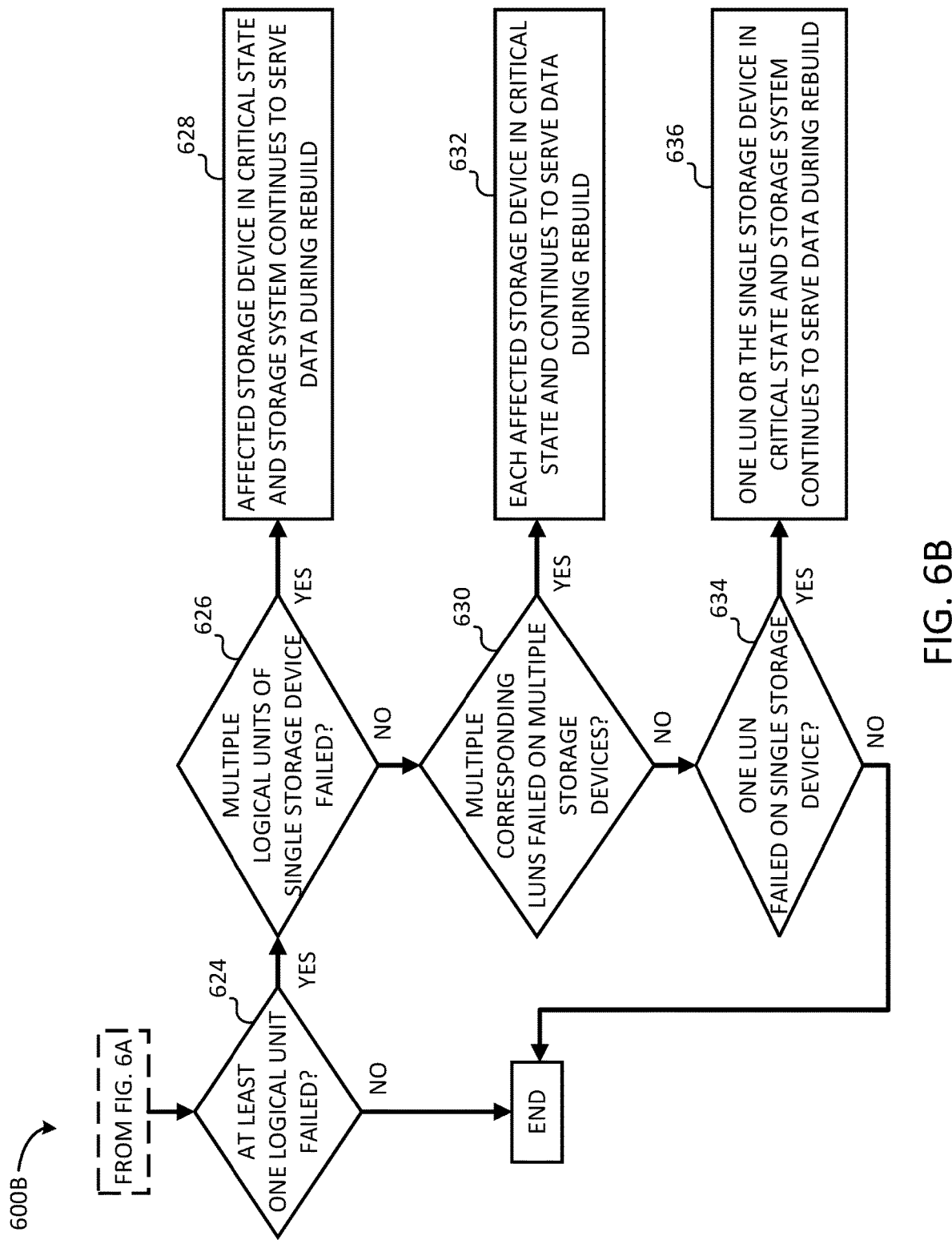
FIG. 6B is a flowchart for a process, and can optionally follow various operations of FIG. 6A, according to an alternate stacked RAID scheme, according to various embodiments.

FIGS. 6A and 6B are flowcharts of a method or process that can include various operations from a process 600A of FIG. 6A and/or various operations from a process 600B of FIG. 6B. Other variations of the processes are contemplated as described in various embodiments of the present disclosure.

FIG. 6A is a flowchart for a process 600A according to an alternate stacked RAID scheme, according to various embodiments.

According to the present disclosure, various methods and operations can be used to implement stacked RAID schemes for multi-LUN or multi-actuator storage devices. Process 600A is another example of a process for implementing a stacked RAID scheme. Process 600A can begin by accessing a first storage devices having first and second logical units at operation 610. At operation 612, a second storage devices having third and fourth logical units can also be accessed. At operation 614, a third storage device having fifth and sixth logical units can also be accessed for a total of three storage devices each having two or more logical units stored thereon.

At operation 616, respective (e.g., first, second, etc.) logical units of each storage device can be grouped into a first striped group. At operation 618, the first, third, and fifth logical units can be grouped into a striped with parity, distributed parity, or double-distributed parity. At operation 620, the second, fourth, and sixth logical units can be grouped into a striped schemed with parity, distributed parity, or double-distributed parity. At operation 622, the process may then end or the process may continue to process 600B of FIG. 6B. Other embodiments and variations according to the examples in the present disclosure can be implemented with respect to process 600A.

FIG. 6B is a flowchart for a process 600B, and can optionally follow various operations of FIG. 6A, according to an alternate stacked RAID scheme, according to various embodiments.

According to various embodiments, the operations of process 600A of FIG. 6A can continue to the operations of process 600B of FIG. 6B, which can include operations involving rebuild of a storage system following a failure of at least one LUN of a multi-LUN storage device. Below are some examples of rebuilding a storage system where a single multi-LUN storage device fails.

After operation 622 of FIG. 6A, a process can continue to operation 624, where it can be determined whether at least one logical unit of a storage system has failed. If the answer is found to be no, the process may end. If the answer at operation 625 is yes, the process may continue to operation 626 where it can be determined whether multiple logical units of a single storage device of have failed. According to one example, where operation 626 is answered in the affirmative, the process can continue to operation 628. In one example, at operation 628, a single LUN 0 or LUN 1 fails on a single storage device. A corresponding RAID 5 (or other) scheme can then be used for fault tolerance. Only one of the stacked RAID 5 storage devices (or LUNs) would be in or enter critical state, and the storage system therefore could continue to serve data, e.g., to a host. If there is spare LUN, it could be either LUN 0 or LUN 1 on a spare dual-actuator or dual-LUN HDD or other storage device.

If the answer at operation 626 is answered in the negative, the process can continue to operation 630. At operation 620 it can be determined whether multiple corresponding LUNs have failed on multiple storage devices. If operation 630 is answered in the affirmative, the process can advance to operation 632. At operation 632, multiple corresponding LUNs 0 or 1 could fail on multiple storage devices such that they do not cause both the LUNs (e.g., LUN 0 and LUN 1) to fail on a single multi-LUN storage device. This can cause a corresponding RAID 5/6, etc. implementation within a storage system to be fault tolerant. If the answer to operation 630 is answered in the negative, the process can continue to operation 634.

At operation 634, it can be determined or optionally concluded that a single LUN has failed on a single drive of a storage system. After operation 634, operation 636 may follow. According to operation 636, a single dual-LUN HDD fails, e.g., because a corresponding LUN 0 and LUN 1 of that dual-LUN HDD had failed. This may result in both RAID 5 (or other) storage devices in the stacked RAID 5 (or other) to enter a critical state, but nevertheless be able to continue to serve data. This would also be the case for an example RAID 0+6 scheme. In the case of the RAID 6-type system, with two LUN failures on a given dual-LUN storage device or HDD, two spare LUNs from either a single dual-LUN HDD or LUNs from two different dual-LUN storage devices or two LUNs from a single-LUN HDD can be used for storage system rebuild operations. Following any of operations 628, 632, or 636, the process may end.

Figure 7:
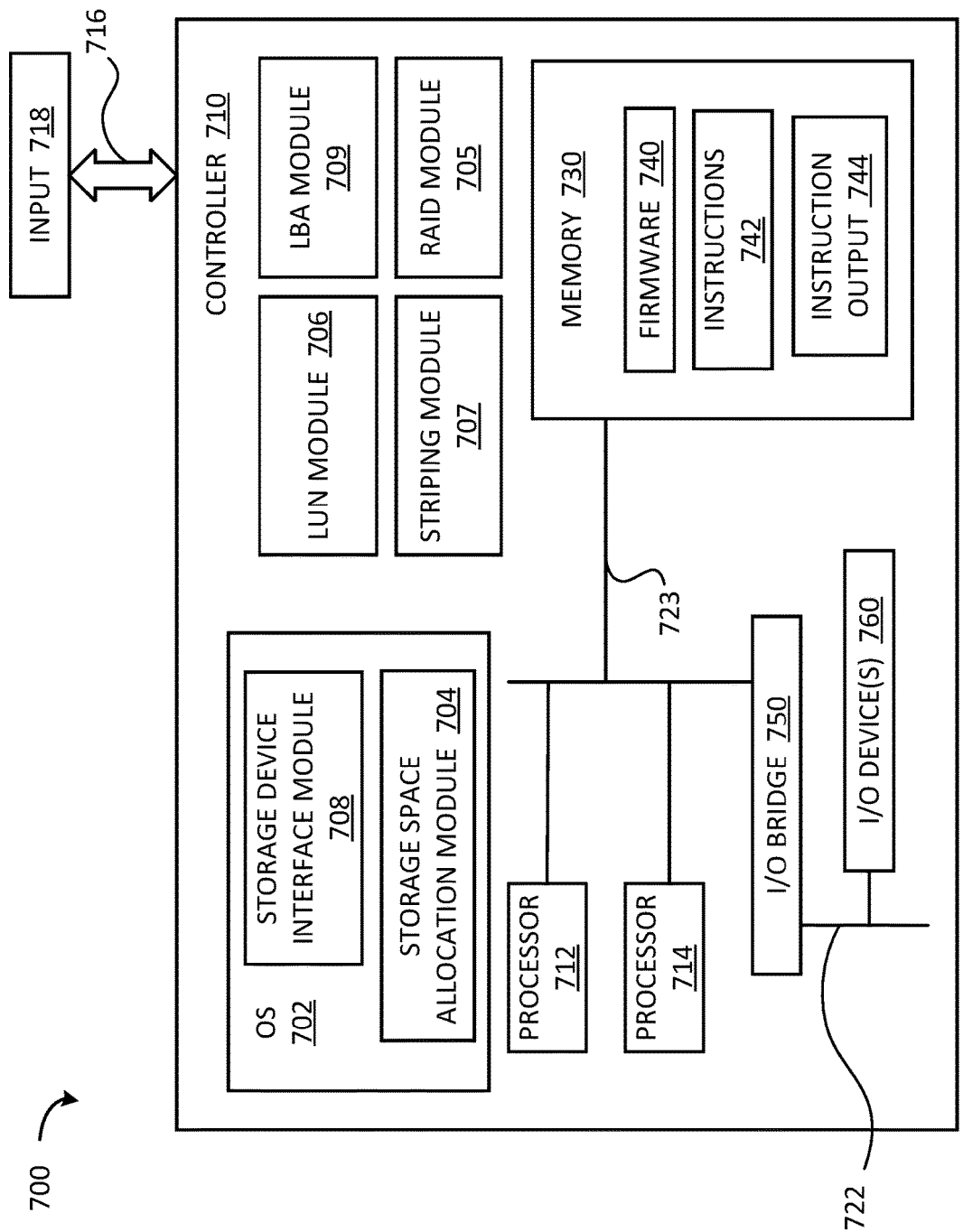
FIG. 7 is a block schematic diagram of a computer system according to embodiments of the present disclosure.

FIG. 7 is a block schematic diagram of a computer system 700 according to embodiments of the present disclosure.

Computer system 700, as shown, is configured with an interface 716 to enable controller 710 to receive a request to manage and protect data according to various stacked RAID schemes, as described in particular with regard to FIGS. 1-6. An input 718 may be received at interface 716. In embodiments, the interface 716 can enable controller 710 to receive, or otherwise access, the input 718 via, for example, a network (e.g., an intranet, or a public network such as the Internet), or a storage medium, such as a disk drive internal or connected to controller 710. The interface can be configured for human input or other input devices, such as described later in regard to components of controller 710. It would be apparent to one of skill in the art that the interface can be any of a variety of interface types or mechanisms suitable for a computer, or a program operating in a computer, to receive or otherwise access or receive a source input or file.

Processors 712, 714 included in controller 710 are connected by a memory interface 720 to memory device or module 730. In embodiments, the memory 730 can be a cache memory, a main memory, a flash memory, or a combination of these or other varieties of electronic devices capable of storing information and, optionally, making the information, or locations storing the information within the memory 730, accessible to a processor. Memory 730 can be formed of a single electronic (or, in some embodiments, other technologies such as optical) module or can be formed of a plurality of memory devices. Memory 730, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 700 can include a plurality of memory devices. A memory interface, such as 720, between a one or more processors and one or more memory devices can be, for example, a memory bus common to one or more processors and one or more memory devices. In some embodiments, a memory interface, such as 723, between a processor (e.g., 712, 714) and a memory 730 can be point to point connection between the processor and the memory, and each processor in the computer 700 can have a point-to-point connection to each of one or more of the memory devices. In other embodiments, a processor (for example, 712) can be connected to a memory (e.g., memory 730) by means of a connection (not shown) to another processor (e.g., 714) connected to the memory (e.g., 723 from processor 714 to memory 730).

Computer 700 can include an input/output (I/O) bridge 750, which can be connected to a memory interface 720, or to processors 712, 714. An I/O bridge 750 can interface the processors 712, 714 and/or memory devices 730 of the computer 700 (or, other I/O devices) to I/O devices 760 connected to the bridge 750. For example, controller 710 includes I/O bridge 750 interfacing memory interface 723 to I/O devices, such as I/O device 760. In some embodiments, an I/O bridge can connect directly to a processor or a memory, or can be a component included in a processor or a memory. An I/O bridge 750 can be, for example, a peripheral component interconnect express (PCI-Express) or other I/O bus bridge, or can be an I/O adapter.

An I/O bridge 750 can connect to I/O devices 760 by means of an I/O interface, or I/O bus, such as I/O bus 722 of controller 710. For example, I/O bus 722 can be a PCI-Express or other I/O bus. I/O devices 760 can be any of a variety of peripheral I/O devices or I/O adapters connecting to peripheral I/O devices. For example, I/O device 760 can be a graphics card, keyboard or other input device, a hard disk drive (HDD), solid-state drive (SSD) or other storage device, a network interface card (NIC), etc. I/O devices 760 can include an I/O adapter, such as a PCI-Express adapter, that connects components (e.g., processors or memory devices) of the computer 700 to various I/O devices 760 (e.g., disk drives, Ethernet networks, video displays, keyboards, mice, styli, touchscreens, etc.).

Computer 700 can include instructions executable by one or more of the processors 712, 714 (or, processing elements, such as threads of a processor). The instructions can be a component of one or more programs. The programs, or the instructions, can be stored in, and/or utilize, one or more memory devices of computer 700. As illustrated in the example of FIG. 7, controller 710 includes a plurality of programs or modules, such as LUN module 706, striping module 707, LBA module 709, and RAID module 705. A program can be, for example, an application program, an operating system (OS) or a function of an OS, or a utility or built-in function of the computer 700. A program can be a hypervisor, and the hypervisor can, for example, manage sharing resources of the computer 700 (e.g., a processor or regions of a memory, or access to an I/O device) among a plurality of programs or OSes.

Programs can be "stand-alone" programs that execute on processors and use memory within the computer 700 directly, without requiring another program to control their execution or their use of resources of the computer 700. For example, controller 710 includes (optionally) stand-alone programs in LUN module 706, striping module 707, LBA module 709, and RAID module 705. A stand-alone program can perform particular functions within the computer 700, such as controlling, or interfacing (e.g., access by other programs) an I/O interface or I/O device. A stand-alone program can, for example, manage the operation, or access to, a memory (e.g., memory 730). A basic I/O subsystem (BIOS), or a computer boot program (e.g., a program that can load and initiate execution of other programs) can be a standalone program.

Controller 710 within computer 700 can include one or more OS 702, and an OS 702 can control the execution of other programs such as, for example, to start or stop a program, or to manage resources of the computer 700 used by a program. For example, controller 710 includes OS 702, which can include, or manage execution of, one or more programs, such as OS 702 including (or, managing) storage device interface module 708, and storage space allocation module 704. In some embodiments, an OS 702 can function as a hypervisor.

A program can be embodied as firmware (e.g., BIOS in a desktop computer, or a hypervisor) and the firmware can execute on one or more processors and, optionally, can use memory, included in the computer 700. Firmware can be stored in a memory (e.g., a flash memory) of the computer 700. For example, controller 710 includes firmware 740 stored in memory 730. In other embodiments, firmware can be embodied as instructions (e.g., comprising a computer program product) on a storage medium (e.g., a CD-ROM, DVD-ROM, flash memory, or disk drive), and the computer 700 can access the instructions from the storage medium.

In embodiments of the present disclosure, computer 700 can include instructions for data management and protection. Controller 710 includes, for example, LUN module 706, striping module 707, LBA module 709, and RAID module 705, which can operate to stripe, translate, protect, and otherwise manage various data blocks based on need or request.

The example computer system 700 and controller 710 are not intended to limiting to embodiments. In embodiments, computer system 700 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, controller 710 can be, for example, a computing device having a processor (e.g., 712) capable of executing computing instructions and, optionally, a memory 730 in communication with the processor. For example, controller 710 can be a desktop or laptop computer; a tablet computer, mobile computing device, personal digital assistant (PDA), or cellular phone; or, a server computer, a high-performance computer (HPC), or a super computer. Controller 710 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

It is understood that numerous variations of data management and protection using a common translation layer could be made while maintaining the overall inventive design of various components thereof and remaining within the scope of the disclosure. Numerous alternate design or element features have been mentioned above.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

Although certain features are described generally herein relative to particular embodiments of the invention, it is understood that the features are interchangeable between embodiments to arrive at data management using a common translation layer for data translation. It is further understood that certain embodiments discussed above include performing data management using a common translation layer using both DML and DPL, as described herein.

Reference is made herein to the accompanying drawings that form a part hereof and in which are shown by way of illustration at least one specific embodiment. The detailed description provides additional specific embodiments. It is to be understood that other embodiments are contemplated and may be made without departing from the scope or spirit of the present disclosure. The detailed description, therefore, is not to be taken in a limiting sense. While the present disclosure is not so limited, an appreciation of various aspects of the invention will be gained through a discussion of the examples provided.

What is claimed is:

1. A method of stacking multiple striped schemes, comprising:
    accessing at least three storage devices each comprising a first and a second logical unit stored therein;
    grouping the respective first and second logical units of each of the at least three storage devices into a first striped scheme across the respective first and second logical units; and
    grouping the respective first logical unit of each of the at least three storage devices into a second striped scheme with parity across the respective first logical units.
2. The method of claim 1, wherein the parity of the second striped scheme is distributed parity among the at least three storage devices according to a RAID 5 scheme.
3. The method of claim 1, wherein the at least three storage devices include at least four storage devices, and wherein the parity of the second striped scheme is double distributed parity among the at least four storage devices according to a RAID 6 scheme.
4. The method of claim 1, further comprising grouping the respective second logical unit of each of the at least three storage devices into a third striped scheme with parity across the respective second logical units.
5. The method of claim 1, wherein at least one of the three storage devices is a multiple-actuator storage device.
6. The method of claim 1, wherein the grouping the respective first and second logical units of each of the at least three storage devices into the first striped scheme across the respective first and second logical units is according to a RAID 0 scheme.
7. The method of claim 1, wherein a first storage device of the at least three storage devices is caused to fail, and in response to the failure of the first storage device, data stored on the at least two other storage devices of the at least three storage devices is used to rebuild the first storage device including the respective first and second logical units of the first storage device, wherein the data stored on the at least two other storage devices includes parity data.
8. The method of claim 1, wherein the first and second striped schemes include striping according to data and parity blocks stored on each of the at least three storage devices.
9. A system, comprising:
    a hardware processor operatively connected to a memory and the system configured to perform steps including:
        accessing at least three storage devices each comprising a first and a second logical unit stored therein;
        grouping the respective first and second logical units of each of the at least three storage devices into a first striped scheme across the respective first and second logical units; and
        grouping the respective first logical unit of each of the at least three storage devices into a second striped scheme with parity across the respective first logical units.
10. The system of claim 9, wherein the parity of the second striped scheme is distributed parity among the at least three storage devices according to a RAID 5 scheme.
11. The system of claim 9, wherein the at least three storage devices include at least four storage devices, and wherein the parity of the second striped scheme is double distributed parity among the at least four storage devices according to a RAID 6 scheme.
12. The system of claim 9, wherein the data management system is further configured to perform the step of:
    grouping the respective second logical unit of each of the at least three storage devices into a third striped scheme with parity across the respective second logical units.
13. The system of claim 9, wherein at least one of the three storage devices is a multiple-actuator storage device.
14. The system of claim 9, wherein the grouping the respective first and second logical units of each of the at least three storage devices into the first striped scheme across the respective first and second logical units is according to a RAID 0 scheme.
15. The system of claim 9, wherein a first storage device of the at least three storage devices is caused to fail, and in response to the failure of the first storage device, data stored on the at least two other storage devices of the at least three storage devices is used to rebuild the first storage device including the respective first and second logical units of the first storage device, wherein the data stored on the at least two other storage devices includes parity data.
16. The system of claim 9, wherein the first and second striped schemes include striping according to data and parity blocks stored on each of the at least three storage devices.
17. A computer program product for managing data in a redundant array of independent disks (RAID) system, comprising: a computer-readable storage device having a non-transitory computer-readable program stored therein, wherein the non-transitory computer-readable program, when executed on a computing device improves the computing device and causes the computing device to:
    access at least three storage devices each comprising a first and a second logical unit stored therein, wherein at least one of the three storage devices is a multiple-actuator storage device;
    group the respective first and second logical units of each of the at least three storage devices into a first striped scheme; and
    group the respective first logical unit of each of the at least three storage devices into a second striped scheme with parity.

18. The computer program product of claim 17, wherein the grouping the respective first and second logical units of each of the at least three storage devices into the first striped scheme is according to a RAID 0 scheme.

19. The computer program product of claim 17, wherein a first storage device of the at least three storage devices is caused to fail, and in response to the failure of the first storage device, data stored on the at least two other storage devices of the at least three storage devices is used to rebuild the first storage device including the respective first and second logical units of the first storage device, wherein the data stored on the at least two other storage devices includes parity data.

20. The computer program product of claim 17, wherein the first and second striped schemes include striping according to data and parity blocks stored on each of the at least three storage devices.

* * * * *